(12) United States Patent
Fuselier

(10) Patent No.: US 9,216,879 B1
(45) Date of Patent: Dec. 22, 2015

(54) AUTOMATED OIL CONTAINMENT BOOM RECOVERY DEVICE

(76) Inventor: Charles Fuselier, St. Martinville, LA (US)

(*) Notice: Subject to any disclaimer, the term of this patent is extended or adjusted under 35 U.S.C. 154(b) by 900 days.

(21) Appl. No.: 13/222,725

(22) Filed: Aug. 31, 2011

Related U.S. Application Data

(60) Provisional application No. 61/379,173, filed on Sep. 1, 2010.

(51) Int. Cl.
*B65H 51/10* (2006.01)
*E02B 15/06* (2006.01)
*E02B 15/08* (2006.01)

(52) U.S. Cl.
CPC ............... *B65H 51/10* (2013.01); *E02B 15/06* (2013.01); *E02B 15/08* (2013.01)

(58) Field of Classification Search
CPC . B65H 51/10; B65H 2701/30; B65H 2701/33
USPC ......... 226/108, 174, 176, 177, 180, 181, 188, 226/190, 186, 187, 1, 4; 242/535, 535.2, 242/535.3, 535.4, 535.5, 564.4; 405/66–69
See application file for complete search history.

(56) References Cited

U.S. PATENT DOCUMENTS

| | | | |
|---|---|---|---|
| 3,527,126 A * | 9/1970 | Jones, Jr. | 82/127 |
| 3,807,617 A | 4/1974 | Tanksley | |
| 4,089,178 A | 5/1978 | Kinase et al. | |
| 4,388,188 A | 6/1983 | Morris | |
| 4,480,800 A | 11/1984 | Oberg et al. | |
| 5,040,918 A | 8/1991 | Taricco | |
| 5,087,152 A | 2/1992 | Whidden | |
| 2006/0201987 A1 * | 9/2006 | Brown | 226/181 |

* cited by examiner

*Primary Examiner* — William E Dondero

(57) ABSTRACT

An automated oil containment boom recovery apparatus and method is disclosed. The apparatus is comprised of a base frame having upward extending boom supports on which are mounted corresponding rotatable wheel and tire combinations. The wheel and tire combinations are pivotally adjustable with respect to each other as desired to accommodate the width of an oil containment boom. Hydraulic motors are provided for rotation of each axle and its corresponding wheel and tire combination. When an oil containment boom is placed lengthwise between the wheel and tire combinations, the boom is gripped between the rotating wheel and tire combinations and drawn into the recovery vessel.

16 Claims, 3 Drawing Sheets

AUTOMATED OIL CONTAINMENT BOOM RECOVERY DEVICE

PRIORITY

This application claims priority to U.S. provisional application entitled "Automated Oil Containment Boom Recovery Device" bearing Ser. No. 61/379,173 filed Sep. 1, 2010, the entire content of which is hereby incorporated by reference.

FIELD OF INVENTION

This invention relates to a device to recover an oil containment boom from the surface of a water body and, more particularly, relates to an automated device for the recovery of an oil soaked containment boom from the water surface to a boat or other vessel.

SUMMARY OF INVENTION

An automated oil containment boom recovery device is disclosed. The device consists of a base frame having at least one pair of parallel vertically upward extending boom supports. At the top of each boom support is a pivot or hinge pin. Pivotally mounted on each boom support is an axle frame, the axle frame being configured to extend radially outward from the hinge pin of each boom support. Each axle frame has a rotatable axle on which is mounted at least one wheel and tire combination, each wheel and tire combination extending radially outward from the corresponding axle. A hydraulic motor is provided at the end of each axle for rotation of the axle and thereby rotation of the corresponding wheel and tire combination.

Each axle frame is pivotally rotated on the boom support by means of at least one hydraulic cylinder, the extension rod of which is pivotally attached to the axle frame and the cylinder of which is pivotally attached to the boom support. Extension and retraction of the extension rod of the hydraulic cylinder will pivotally move each axle frame and the corresponding wheel and tire combination about the boom support hinge pin, toward and away from each other to a desired position with respect to the parallel boom supports.

The recovery device is further provided with various hoses, pumps, and control valves to activate the hydraulic motor on each of the axle shafts and to manipulate each of the extension rods of the axle frame support hydraulic cylinders. While it is thought that a hydraulic motor is will be utilized to minimize the risk of sparking, other types of motors such as spark proof electric motors might also be utilized.

The support frame of the recovery device may be configured to be mounted within a lifting or carry basket so that the recovery device may be readily moved onto and off of a boat or barge by a crane or other lifting device.

While the recovery device may be used on an onshore location such as a wharf or a pier, it is thought that the recovery device will mounted in or carried on a boat, barge, or other boom recovery vessel. To recover a boom from the water and into a boom recovery vessel, the recovery vessel is placed at a position in proximity to the boom to be recovered. The extension rod of each axle frame support hydraulic cylinder is extended or retracted to pivot each axle frame on the boom support. This pivoting will allow each axle frame and its corresponding wheel and tire combination to be placed in a desired position with respect to the parallel boom supports.

The boom to be recovered is grabbed by a grapple, boat hook, or other device and the boom end is lifted by the user from the water surface and placed between the corresponding wheel and tire combinations. The hydraulic motors on each of the axle are then used to turn each axle and thus the corresponding wheel and tire combination. As the wheel and tire combinations turn, the boom will be gripped by the rotating tires of each wheel and tire combination and the boom will be drawn up between these rotating tires from the water surface and into the vessel or a container mounted in the vessel.

In use, the position of each axle frame and its corresponding wheel and tire combination is pivoted on its respective boom support to a desired position by extension and retraction of the extension rod of the each of the axle frame support hydraulic cylinder. This will allow the angle between the corresponding wheel and tire combinations to be adjusted in order to adapt the recovery device to accommodate and lift booms of different materials and dimensions.

Use of the automated recovery device will reduce the physical contact with the boom to be lifted by the operating personnel and serve to minimize the risk of harmful skin and body contact with the contents of the boom. The automated recovery device is intended to be used with oil absorbent booms though it may be used to recover other types of booms.

DESCRIPTION OF THE EMBODIMENT

Figure 1:
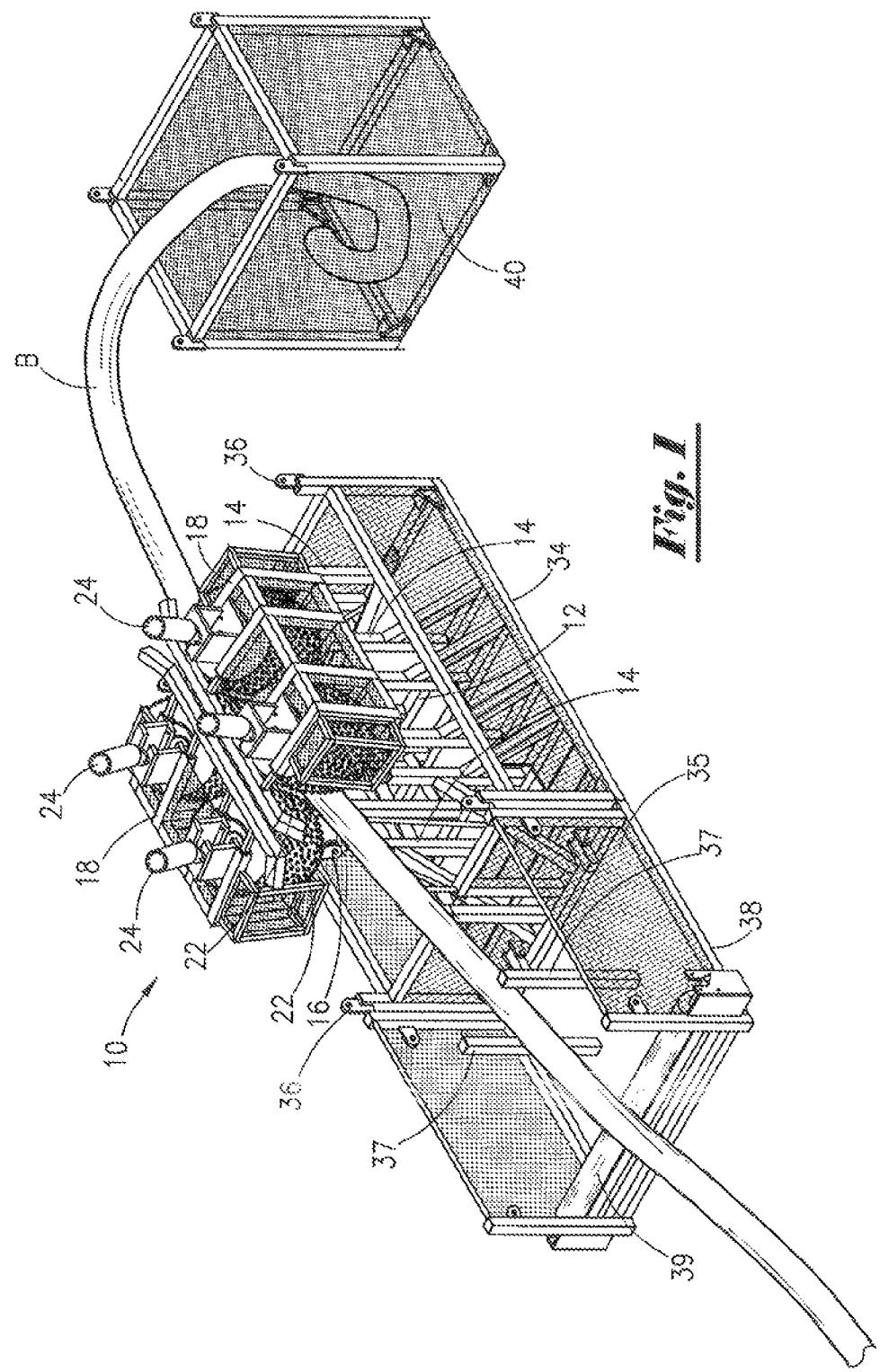
FIG. 1 is a perspective view of the automated boom recovery device.
Figure 2:
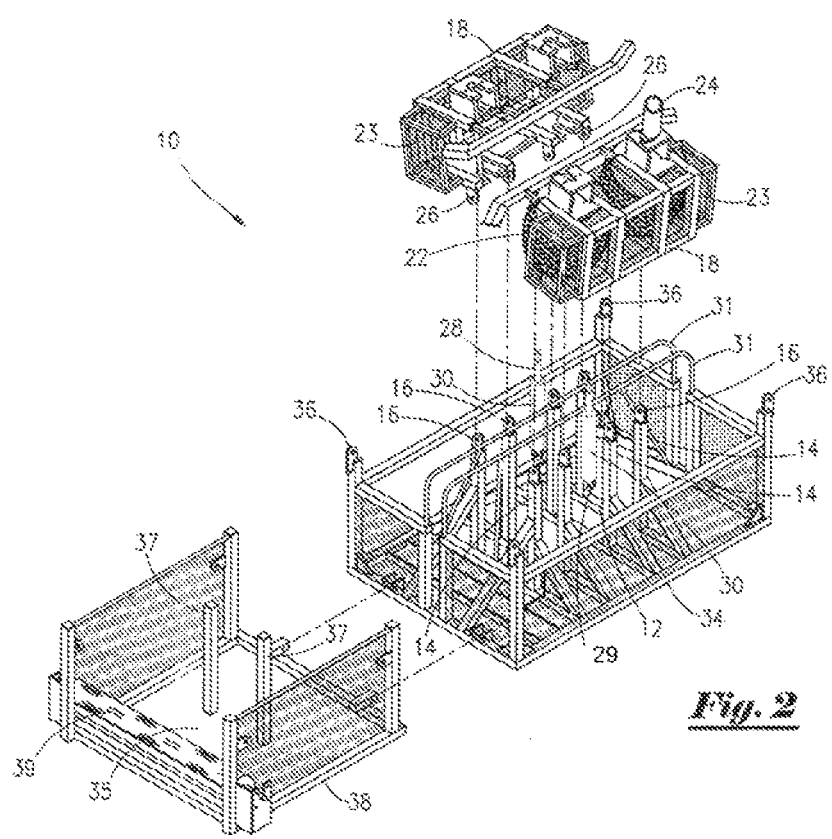
FIG. 2 is an exploded perspective assembly view of the automated boom recovery device shown in FIG. 1.
Figure 3:
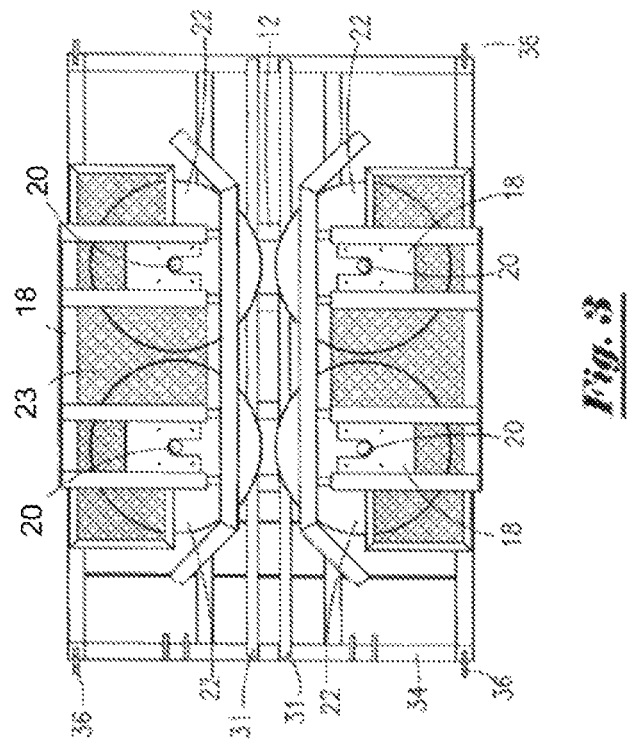
FIG. 3 is top view showing the frame and wheel and tire combinations of the automated boom recovery device shown in FIG. 1.
Figure 4:
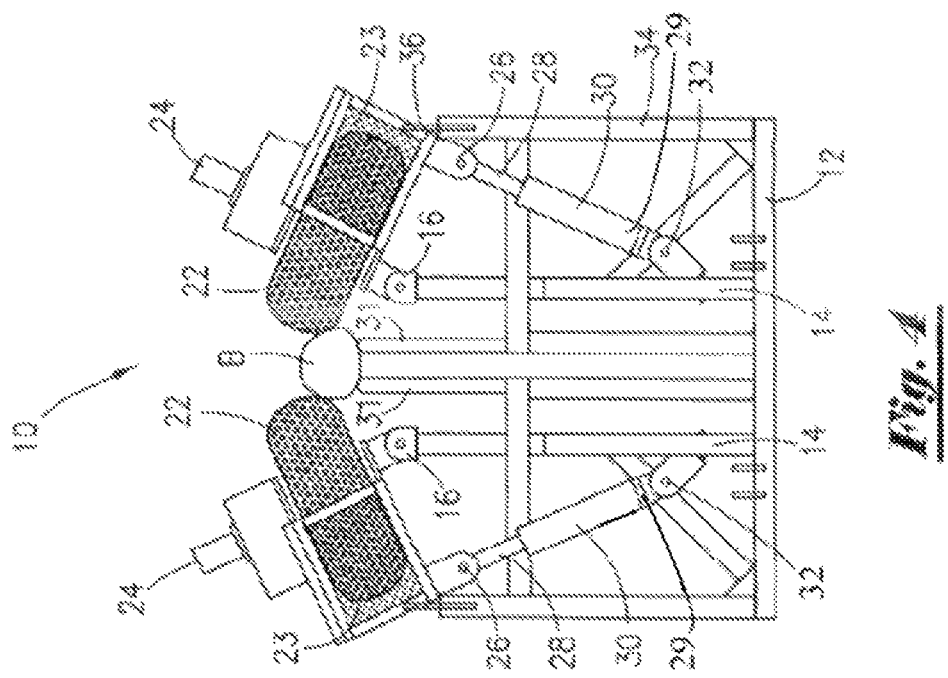
FIG. 4 is an end view showing the frame and wheel and tire combinations of the automated boom recovery device shown in FIG. 1.

Referring now to the drawings, FIG. 1 and FIG. 2 show perspective views of the boom recovery device (10). As shown in FUG, 1 and FIG. 2, and more particularly in FIGS. 3 and 4, the recovery device (10) is comprised of a base frame (12) having a pairs of parallel, upward extending boom supports (14). As shown the booms supports (14) extend along corresponding parallel rows. At the top of each boom support (14) is a pivot or hinge pin (16). Pivotally mounted on each boom support is axle frame (18), the axle frame (18) is configured to extend radially outward from the hinge pin (16). Each axle frame (18) has a rotatable axle (20) on which is mounted a wheel and tire combination (22), each wheel and tire combination (22) extends radially outward from the corresponding axle (20). A hydraulic motor (24) is provided at the end of each axle (20) for rotation of the axle (20) and thereby by the corresponding wheel and tire combination (22). A guard cage (23) may be provided around the axle frame (18) to protect a user from the rotating wheel and tire combination (22). The motor (24) may also be coupled to a gear box to regulate the rotation of the axle and the wheel and tire combinations.

Each axle frame (18) is further provided with a pivot hinge (26) to which is pivotally mounted the extension rod (28) of an axle frame support hydraulic cylinder (30). The base (29) of the axle frame support hydraulic cylinder (30) is in turn pivotally attached to the base frame (12) at hinge (32). Extension and retraction of the extension rod (28) of each axle frame support hydraulic cylinder (30) will pivotally tilt each axle frame (18) and its corresponding wheel and tire combination (22) toward and away from each other to a desired position with respect to the parallel boom supports (14). The recovery device (10) is further provided with various hoses with attached pumps and control valves (not shown) to activate the hydraulic motor (24) on each axle (20) and to manipulate each extension rod (28) of each axle frame support hydraulic cylinder (30). Boom guide rails (31) are mounted on the frame and extend longitudinally between the corresponding wheel and tire combination (22).

As shown in FIGS. 1 and 2, the base frame (12) of the recovery device (10) may be configured as, incorporated into, or mounted within a lift basket (34) having padeyes (36). The padeyes are used for the attachment of lifting slings to facilitate lifting the recovery device (10) into and out of a vessel. The recovery device (10) may also be provided with a boom guide (38) to facilitate positioning of a boom to be recovered with respect to each wheel and tire combination (22). The boom guide (38) shown is comprised of a basket (35) configured to correspond with and attach to the lift basket (34) which carries the recovery device (10). The boom guide (38) has upwardly ending guide posts (37) and a guide roller (39).

The recovery of a boom (B) from the water, as generally illustrated in FIG. 1, is accomplished by mounting the base frame (12) of the recovery device (10) within lift basket (34) and placing the basket (34) with the boom recovery device (10) onto a boom recovery vessel or by placing the recovery device (10) on a land location in proximity to a boom (B) to be recovered. Whether the recovery device (10) is on land or on a vessel offshore, the recovery device (10) is positioned so that the recovery device (10) is in proximity to boom (B) to be recovered.

To set the device up for boom recovery, the boom guide (38) is attached to the frame (34) and the extension rod (28) of each axle frame support hydraulic cylinder (30) is extended or retracted as necessary to move the axle frames (18) about pivot hinge (26) and thereby place the each wheel and tire combination (22) in a desired corresponding position for orientation and adjustment of the angle between the corresponding wheel and tire combinations (22). Pivoting the axle frame (18) on the pivot hinge (26) allows the position of the corresponding wheel and tire combinations (22) to be adapted to accommodate lift booms (B) of different materials and dimensions.

Once the position of the corresponding wheel and tire combinations (22) is adjusted, an end segment of the boom (B) to be recovered is then lifted by means of a grapple, boat hook, gin pole, or other such lifting means and is lifted by the user from the water surface and placed lengthwise between and upon each wheel and tire combination (22) above boom guide rails (31) and between the guide posts (37) and upon guide roller (39). The hydraulic motors (24) on each of the axle shafts are then used to turn each axle (20) and thus the corresponding wheel and tire combination (22). As each wheel and tire combination (22) turns, the boom (B) will be gripped by the rotating wheel and tire combinations and the boom (B) will be drawn up between the rotating wheel and tire combinations from the water surface and into the vessel or into a recovery container basket (40). The guide posts (37) serve to align the boom (B) between the rotating wheel and tire combinations and the guide roller (39) reduces the resistance of the boom (B) as is it pulled along the rotating wheel and tire combinations (22).

If necessary during the recovery of the boom (B), the extension rods (28) of each axle frame support hydraulic cylinder (30) may be further extended or retracted as might be necessary. This will allow the axle frames (18) and each wheel and tire combination (22) to be moved toward and away from each other as may be necessary for gripping the boom (B) in order to facilitate its recovery.

It is thought that the recovery device (10) of the present invention and many of its attendant advantages will be understood from the foregoing description and it will be apparent that various changes may be made in the arrangement of the parts thereof without departing from the spirit and scope of the invention or sacrificing all of its material advantages, the recovery device (10) described herein being merely an exemplary embodiment of the invention.

I claim:

1. An apparatus for recovery of a floating oil containment boom comprising:
    (a) a base frame;
    (b) a boom guide rail mounted on said base frame;
    (c) at least one pair of boom supports extending upward from said base frame;
    (d) an axle frame pivotally mounted on each boom support;
    (e) a rotatable axle mourned on each axle frame;
    (f) a wheel and tire combination extending radially outward from and mounted onto each said rotatable axle;
    (g) at least one hydraulic cylinder mounted on each boom support having an extension rod, said hydraulic cylinder and said extension rod pivotally attached to said base frame and said axle frame whereby extension of said extension rod will pivot each said axle frame on said boom support;
    (h) a hydraulic motor for rotation of each said axle and thereby by the corresponding wheel and tire combination; and
    (g) a segment of a floating length of said boom, said boom segment placed lengthwise between and upon each said wheel and tire combination above said boom guide rails whereby rotation of said axles and said wheel and tire combinations will thereby draw said length of boom along said guide rails.

2. The apparatus for recovery of a floating oil containment boom as recited in claim 1 farther comprising a guard cage on each said axle frame.

3. The apparatus for recovery of a floating oil containment boom as recited in claim 2 further comprising an attachable boom guide, said boom guide having upwardly ending guide posts and a guide roller.

4. The apparatus for recovery of a floating oil containment boom as recited in claim 3 wherein said base frame is further configured as a lift basket with a plurality of padeyes.

5. The apparatus for recovery of a floating oil containment boom as recited in claim 4 wherein said boom guide is releasably attached to said base frame lift basket configuration.

6. An apparatus for recovery of a floating oil containment boom comprising:
    (a) a base frame, said base frame configured as a lift basket;
    (b) a boom guide rail mounted to said base frame;
    (c) a first and second rows of parallel upwardly extending boom supports mounted to said base frame;
    (d) an axle frame pivotally mounted on said boom supports along each said parallel row of boom supports;
    (e) at least two rotatable axles mounted on each axle frame;
    (f) a wheel and tire combination extending radially outward from and mounted onto each said rotatable axle;
    (g) a plurality of pivot hinges mounted to each said axle frame;
    (h) at least one hydraulic cylinder mounted on each boom support having an extension rod, said hydraulic cylinder and said extension rod pivotally attached to said axle frame at a selected said pivot hinge and to said base frame whereby extension of said extension rod will pivot each said axle frame on said boom supports; and (i) a motor in combination with said each said axle whereby said axle and thereby by said wheel and tire combination may be rotated whereby placement of a length of said boom lengthwise between and upon said wheel and tire combinations will thereby draw said boom along said boom guide rails upon rotation of each said axle.

7. The apparatus for recovery of a floating oil containment boom as recited in claim 6 further comprising a guard cage on each said axle frame.

8. The apparatus for recovery of a floating oil containment boom as recited in claim 7 further comprising an attachable boom guide, said boom guide having upwardly ending guide posts and a guide roller.

9. The apparatus for recovery of a floating oil containment boom as recited in claim 8 wherein said attachable boom guide is releasably attached to said base frame.

10. The apparatus for recovery of a floating oil containment boom as recited in claim 9 wherein said motor is a hydraulic motor.

11. The apparatus for recovery of a floating oil containment boom as recited in claim 10 wherein said base frame is further comprised of a plurality of padeyes whereby said base frame may be lifted.

12. The apparatus for recovery of a floating oil containment boom as recited in claim 11 wherein said apparatus is carried by a vessel.

13. An apparatus for recovery of a floating boom comprising:

(a) adjacent pairs of corresponding boom supports;

(b) rotatable wheel and tire combinations supported by said boom supports;

(c) boom guide rails mounted on said base frame and positioned below and between said rotatable wheel and tire combinations;

(d) at least one motor whereby said rotatable wheel and tire combinations are rotated; and (e) a segment of length of said boom positioned lengthwise above said boom guide rails upon and between said rotatable wheel and tire combinations whereby rotation of said rotatable wheel and tire combinations will thereby draw said boom along said boom guide rails upon.

14. The apparatus for recovery of a floating boom recited in claim 13 wherein said boom is an oil containment boom.

15. The apparatus for recovery of a floating boom as recited in claim 14 wherein said apparatus is carried by a vessel.

16. The apparatus for recovery of a floating boom as recited in claim 13 further comprising:

(a) a base frame supporting said adjacent pairs of corresponding boom supports; and (b) a plurality of padeyes mounted on said base frame.

\* \* \* \* \*